No. 815,137. PATENTED MAR. 13, 1906.
A. H. BEECHER.
SAFETY STARTING MECHANISM FOR MOTORS.
APPLICATION FILED OCT. 24, 1904.
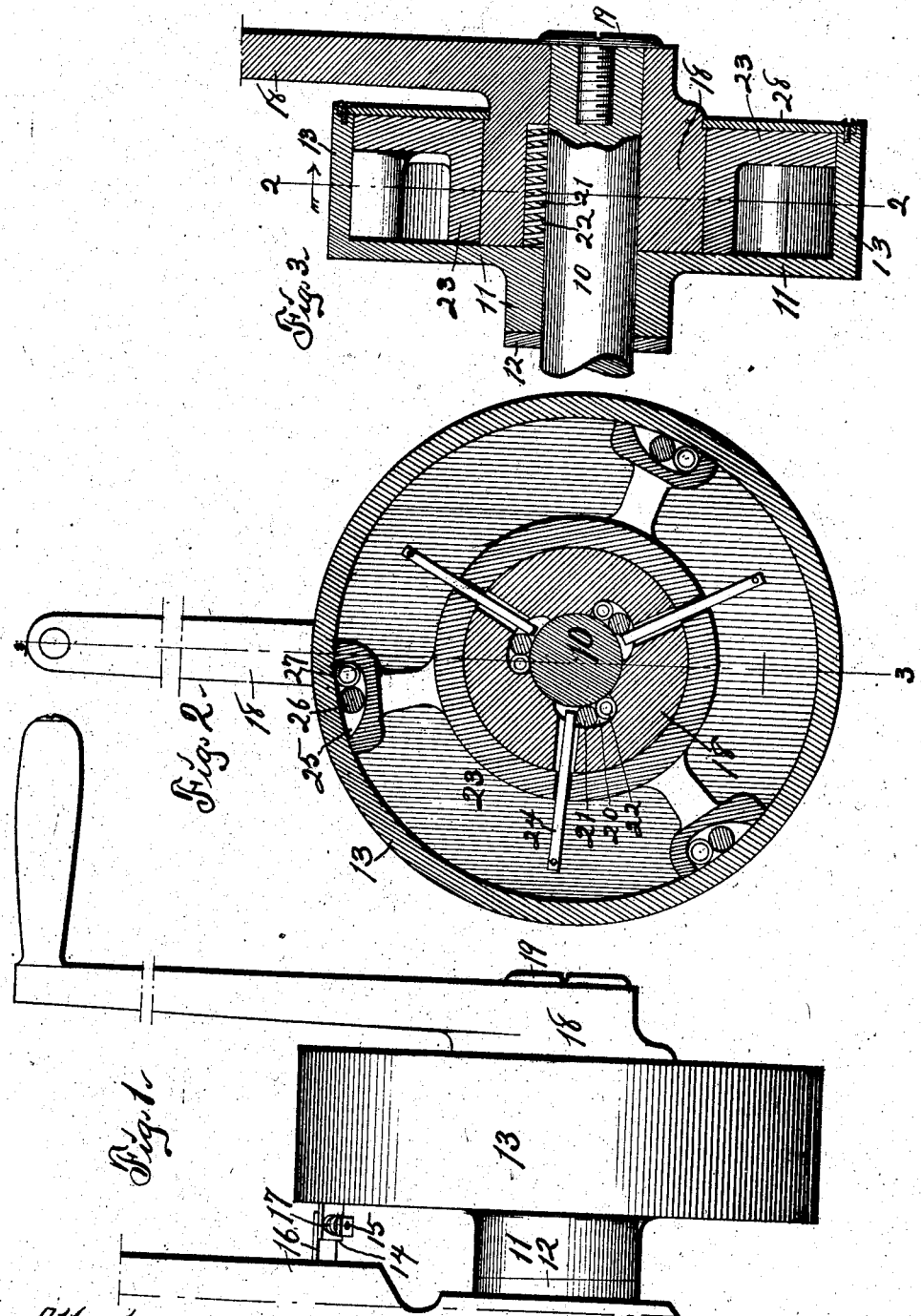
Attest:
W. E. Ellis.
N. W. Winters
Inventor:
A. H. Beecher
By Heswett
Att'y

UNITED STATES PATENT OFFICE.

ADOLPHUS H. BEECHER, OF MASON CITY, IOWA.

SAFETY STARTING MECHANISM FOR MOTORS.

No. 815,137.  Specification of Letters Patent.  Patented March 13, 1906.

Application filed October 24, 1904. Serial No. 229,873.

*To all whom it may concern:*

Be it known that I, ADOLPHUS H. BEECHER, a citizen of the United States of America, and a resident of Mason City, Cerro Gordo county, Iowa, have invented a new and useful Safety Starting Mechanism for Motors, of which the following is a specification.

The object of this invention is to provide improved means for starting a motor.

A further object of this invention is to provide means for starting a motor, which means will prevent the accidental application of back pressure to injure the operator.

A further object of this invention is to provide means for starting a gasolene-engine, in the use of which means the force generated by back-firing of the engine will not be applied to injure the operator.

My invention consists in the construction, arrangement, and combination of elements hereinafter set forth, pointed out in my claims, and illustrated by the accompanying drawings, in which—

Figure 1 is a side elevation of the complete device. Fig. 2 is a cross-section of the device. Fig. 3 is a section view of the device at right angles to Fig. 2.

In the construction of the device as shown the numeral 10 designates an engine-shaft or crank-shaft of an engine or motor, in this instance presumed to be driven by an explosive-engine medium. A casing 11 is mounted loosely on the shaft 10 and is held against movement in one direction longitudinally of said shaft by a collar 12. The casing 11 is formed with a rim or circular flange 13, concentric with and surrounding the shaft 10. The casing 11 is formed with a lug or ear 14, adapted to receive a bolt 15, mounted in a suitable support 16, such as an engine-body, and a coil-spring 17 is interposed between said ear and support. The casing 11 has a slight movement relative to the support 16, which movement is cushioned by the spring 17. A crank 18 is mounted loosely on the shaft 10, and the hub of said crank extends within and concentric with the rim 13 of the casing. A screw 19 is seated in the outer end portion of the shaft 10, and the head of said screw overlaps the crank 18 and limits movement of said crank longitudinally of the shaft. The crank 18 and screw 19 also prevent movement of the casing 11 longitudinally of the shaft and away from the collar 12. A plurality of tapering seats 20, in this instance three in number, are formed in the inner surface of the crank 18 and open to the shaft 10. Friction-rollers 21, in this instance three in number, are mounted in the tapering seats 20 and normally are pressed toward the narrower ends of said seats by springs 22, in this instance three in number, also mounted in said seats. It is the function of the springs 22 to press the rollers 21 into the narrower portion of the slots 20 and establish through said rollers a friction engagement between the shaft 10 and crank 18. In the rotation of the crank 18 clockwise or to the right (which will be to the left as the parts are illustrated in Fig. 2) by manual force applied to the handle thereof the shaft 10 is rotated to the right through the medium of the rollers 21. Such movement of the shaft 10 effects a starting of the engine or motor in this instance by compressing a charge of motive fluid in an explosion-chamber and igniting it in a conventional manner. It sometimes occurs that the charge is ignited in such a manner and at such time as to throw the whole force of the explosion against the crank 18 and against the manual force of the operator manipulating said crank to the end of causing serious damage and hurt to the operator. To avoid such occurrences, I have provided a releasing plate or disk 23, concentric with and surrounding the hub of the crank 18. The disk 23 loosely embraces the hub of the crank 18 and is provided with dogs or arms 24, in this instance three in number, which dogs or arms extend inward from points of attachment to the disk through notches in the rim of the disk and through notches in said hub into the tapering seats 20 and in front of and out of contact with the rollers 21. The dogs or arms 24 may be arranged for adjustment on the disk 23 to compensate for wear thereof in use. Tapering seats 25, tapered opposite to the seats 20, are formed in the periphery of the disk 23, and friction-rollers 26 are mounted in said seats 25 and normally are pressed toward the narrower portion of said seats by springs 27. In turning the crank 18 and shaft 10 to the right the release plate or disk, carrying the dogs 24, also turns to the right; but when the engine back-fires and applies back pressure suddenly to the shaft and crank said shaft, crank, dogs, and release-plate are moved suddenly to the left, and such movement to the left causes the friction-rollers 26 to engage or bite the inner surface of the rim 13 of the casing and locks the release-plate against further movement in such direction.

The locking of the release-plate against movement to the left stops the dogs 24 and causes said dogs to release the frictional connection of the rollers 21 between the hub of the crank 18 and the shaft, thereby releasing said crank from the shaft. Having in mind that a very small movement of rotation of the release plate or disk 23 to the left will establish frictional engagement between said release-plate and the rim 13 of the casing 11 and also that a very small movement of the rollers 21 in the seats 20 will release the connection through said rollers between the crank and shaft, it is evident that the release of the crank from the shaft on the occasion of backfiring of the engine is practically instantaneous and will not permit such rearward movemen of the crank as would cause hurt or damage to the operator. A dust shield or guard 28 is mounted around the hub of the crank 18 and is fixed to the rim 13 of the casing.

I claim as my invention—

1. A safety starting mechanism for motors, comprising a casing loosely mounted on a shaft and spring-held against rotation, a crank loosely mounted on said shaft, engaging devices between said crank and shaft and releasing devices connected with said casing and adapted to release said engaging devices.

2. A safety starting mechanism for motors, comprising a shaft, a casing mounted on said shaft loosely, means for limiting rotation of said casing, a crank loosely mounted on said shaft, friction devices interposed between said crank and shaft, a release-plate, friction devices interposed between said release-plate and the casing and release devices on said release-plate and adapted to engage and release the friction devices between the crank and shaft.

3. A safety starting mechanism for motors, comprising a shaft, a casing on said shaft, a rim on said casing, means for limiting movement of said casing on said shaft, a crank loosely mounted on said shaft, spring-pressed friction-rollers between and adapted to connect said crank and shaft, a release-plate loosely mounted on said crank, spring-pressed friction-rollers between and adapted to connect said release-plate and the rim of the casing, and arms on said release-plate adapted to engage and release the friction-rollers between the crank and shaft.

Signed by me at Des Moines, Iowa, this 11th day of October, 1904.

ADOLPHUS H. BEECHER.

Witnesses:
S. C. SWEET,
E. BRUNEMEIER.